United States Patent
Laing et al.

(10) Patent No.: US 7,382,070 B2
(45) Date of Patent: Jun. 3, 2008

(54) SPHERICAL BEARING, ELECTRIC MOTOR AND CIRCULATION PUMP

(75) Inventors: Karsten Laing, Theodor-Heuss-Strasse 29 71566, Althutte (DE); Janos Ternak, Cegled (HU)

(73) Assignees: Oliver Laing, Stuttgart (DE); Karsten Laing, Stuttgart (DE); Birger Laing, Stuttgart (DE)

( * ) Notice: Subject to any disclaimer, the term of this patent is extended or adjusted under 35 U.S.C. 154(b) by 254 days.

(21) Appl. No.: 11/055,140

(22) Filed: Feb. 9, 2005

(65) Prior Publication Data

US 2005/0225186 A1    Oct. 13, 2005

(30) Foreign Application Priority Data

Feb. 12, 2004  (DE) .............................. 2004 008 158

(51) Int. Cl.
*H02K 5/16* (2006.01)
(52) U.S. Cl. .................. 310/90; 384/108; 384/610
(58) Field of Classification Search .................. 310/90; 384/108, 110, 245, 610
See application file for complete search history.

(56) References Cited

U.S. PATENT DOCUMENTS

| | | | |
|---|---|---|---|
| 3,401,963 A | | 9/1968 | Wehner |
| 3,558,948 A | | 1/1971 | Laing |
| 3,803,432 A | * | 4/1974 | Laing ........................ 310/90 |
| 4,043,706 A | | 8/1977 | Walker |
| 4,644,208 A | | 2/1987 | Laing |
| 4,818,193 A | | 4/1989 | Laing et al. |
| 4,822,256 A | | 4/1989 | Laing |
| 4,874,300 A | * | 10/1989 | Laing et al. ................ 417/420 |
| 5,328,271 A | * | 7/1994 | Titcomb ..................... 384/108 |
| 6,046,881 A | * | 4/2000 | Tielemans et al. ....... 360/99.08 |
| 2003/0228079 A1 | | 12/2003 | Mutai et al. |

FOREIGN PATENT DOCUMENTS

| | | |
|---|---|---|
| DE | 707 617 C | 6/1941 |
| DE | 1 827 568 U | 3/1961 |
| DE | 24 24 552 A1 | 1/1975 |
| DE | 35 38 504 C2 | 6/1986 |
| DE | 35 38 507 A1 | 6/1986 |
| DE | 35 38 508 A1 | 6/1986 |
| DE | 35 20 596 A1 | 12/1986 |
| DE | 8707360 U | 7/1987 |
| DE | 36 29 964 A1 | 3/1988 |
| DE | 36 31 710 C2 | 3/1988 |
| DE | 36 36 940 A1 | 5/1988 |
| DE | 36 36 941 A1 | 5/1988 |

(Continued)

*Primary Examiner*—Dang Le
(74) *Attorney, Agent, or Firm*—Foley & Lardner LLP

(57) ABSTRACT

To improve a spherical bearing including a bearing body with a convex spherical surface, a holder, on which the bearing body is disposed, and a bearing shell with a concave spherical surface, the bearing shell being rotatably mounted on the bearing body, in such a way that the mounting of the bearing body on the holder can be carried out a simple and low-cost way, it is provided that the holder is made of a plastics material, and the holder and the bearing body are held non-rotatably with respect to each other. A device for preventing rotation, which holds the bearing body on the holder to be non-rotatable with respect to the holder, may be provided.

39 Claims, 5 Drawing Sheets

FOREIGN PATENT DOCUMENTS

| | | |
|---|---|---|
| DE | 37 44 101 A1 | 7/1989 |
| DE | 39 01 138 A1 | 7/1990 |
| DE | 196 15 872 A1 | 10/1997 |
| DE | 196 29 843 A1 | 1/1998 |
| DE | 197 42 500 A1 | 4/1999 |
| DE | 102 45 015 | 5/2003 |
| DE | 102 45 016 | 5/2003 |
| FR | 1 282 185 | 1/1962 |
| GB | 943 191 | 12/1963 |
| GB | 2 182 392 A | 5/1987 |
| GB | 2 213 208 A | 8/1989 |

* cited by examiner

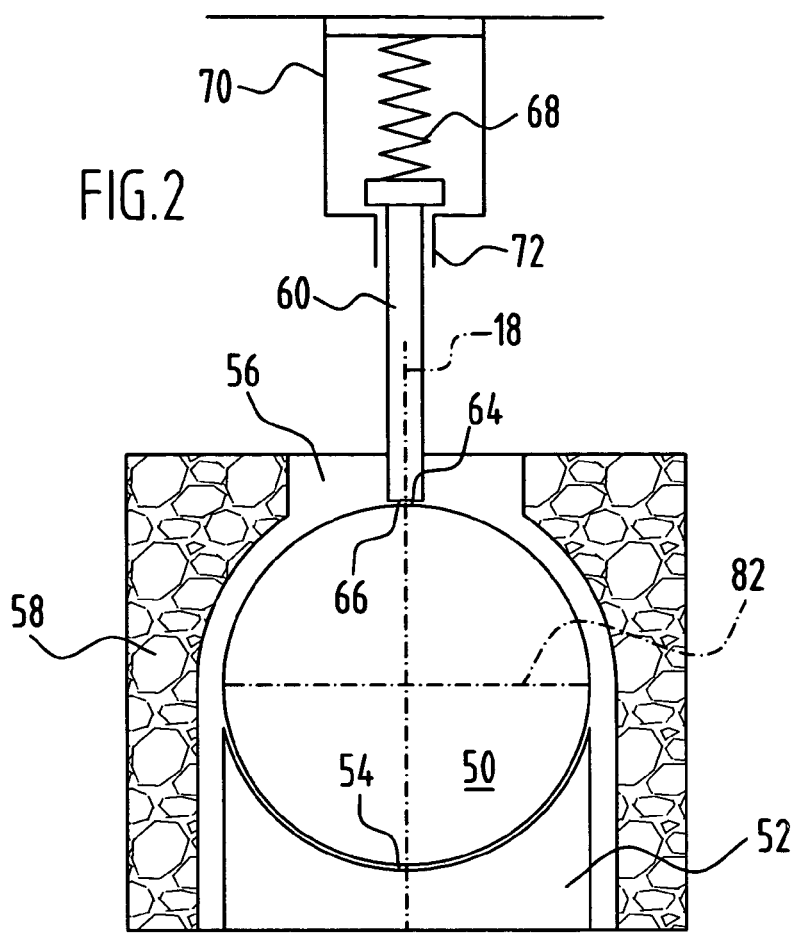
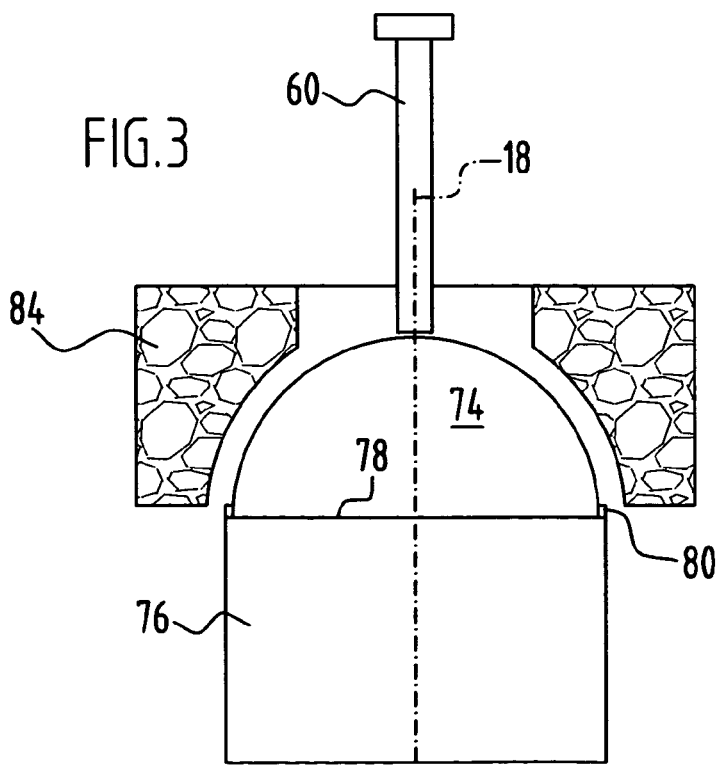

SPHERICAL BEARING, ELECTRIC MOTOR AND CIRCULATION PUMP

CROSS-REFERENCE TO RELATED PATENT APPLICATIONS

The present disclosure relates to the subject matter disclosed in German application No. 10 2004 008 158.1 of Feb. 12, 2004, which is incorporated herein by reference in its entirety and for all purposes.

BACKGROUND OF THE INVENTION

The invention relates to a spherical bearing, comprising a bearing body with a convex spherical surface, a holder, on which the bearing body is disposed, and a bearing shell with a concave spherical surface, the bearing shell being rotatably mounted on the bearing body.

The invention also relates to an electric motor with such a spherical bearing and to a circulation pump with such a spherical bearing.

The bearing body must be fixed on the holder. It is known from DE 36 36 941 A1 to provide the bearing ball with a drilled hole, into which the end of a bearing support facing the ball protrudes as a holder.

DE3744 101 A1 discloses a bearing ball mount, the ball consisting of hard ceramic material and having a drilled hole, by means of which it is mounted on the bearing support by a form fit or frictional engagement.

Bearing bodies, and in particular bearing balls, may have a diameter of 6 mm or less. Correspondingly small holes then have to be drilled in such bearing bodies. This involves great expense, in particular where ceramic materials are concerned. A considerable proportion of the costs of a circulation pump with such a spherical bearing are attributable to the production of a drilled hole in the bearing body.

SUMMARY OF THE INVENTION

In accordance with embodiments of the invention, a spherical bearing is provided with which the mounting of the bearing body on the holder can be carried out in a simple and low-cost way.

In accordance with particular embodiments of the invention, the holder is made of a plastics material, and the holder and the bearing body are held non-rotatably with respect to each other. A device for preventing rotation, which holds the bearing body on the holder to be non-rotatable with respect to the holder, may be provided.

The use of a plastics material allows a holder to be produced in a simple way. In particular, a holder can be produced integrally with walls which delimit an air gap. The boundary walls for an air gap can once again be made of a plastics material whenever the influence of the air gap is reduced, and in particular, when a rotor generates a magnetic field, i.e. is coupled to a stator in a permanently magnetic manner, and electronic commutation is provided.

If a device for preventing rotation is provided, there is no longer any need in principle for a drilled hole to be provided, so that the required machining steps for the production of a drilled hole are no longer required. When a plastics material is concerned, a device for preventing rotation can be obtained in a simple way. The device for preventing rotation is a lock device against rotation and secures the bearing body against rotation relative to the holder.

In one embodiment, the holder is made in particular of a thermoplastic material, such as for example PPS. Such a material also allows a fluid seal of the stator with respect to the air gap to be achieved in a simple way.

In particular, the bearing shell is connected to a rotor, so that the rotor can rotate on the bearing body by means of the spherical bearing.

It is provided that the holder is connected to the bearing body of the bearing. As a result, rotationally resistant fixing of the holder is achieved.

The holder is advantageously integrally connected to a wall which is facing the rotor. This allows a correspondingly large part of the spherical bearing, and in particular of an electric motor, to be produced integrally with such a spherical bearing.

The bearing body is preferably made of a hard material, and in particular a ceramic material. The bearing body then has a very high abrasion resistance, whereby the service life of the spherical bearing is in turn increased.

It may be provided that the holder is adapted in its shaping to the shaping of the bearing body. This provides a bearing bed which receives the bearing body and thereby holds it in such a way that a means for preventing twisting can be obtained in a simple way.

It may be provided that the means for preventing twisting comprises a non-slip device. If the frictional force between the bearing body and the holder is greater than the frictional force between the bearing shell and the bearing body, the bearing body is fixed to the holder to be non-rotatable with respect to the holder. The non-slip feature has the effect of increasing the coefficient of friction between the bearing body and the holder, and consequently of increasing the frictional force. A device for preventing rotation can then be obtained or improved in a simple way by means of a non-slip feature.

For example, a non-slip coating, such as for example a rubber coating, is arranged on the holder. This prevents the sliding body from being able to turn in relation to the holder.

To form the non-slip device, it may alternatively or additionally be provided that a surface of the bearing body that faces the holder is roughened, for example by means of sandblasting.

It is advantageous if the bearing body is injection-molded in the holder. One effect of this is that the assembly of the bearing is made easier, since there is no need to provide an additional step for mounting the bearing body. Injection-molding provides a simple way of achieving a means for preventing the bearing body from rotating on the holder, in that for example the bearing body has recesses in which material of the holder can then engage.

In particular, the bearing body has one or more recesses in which holding elements engage. These recesses with engaging holding elements (of the holder) then provide rotationally resistant fixing of the bearing ball on the holder.

It is most particularly advantageous if the at least one recess of the bearing body and the holding element are adapted to each other in such a way that, when the bearing body and the holder are at their greatest distance apart, the holding element cannot completely leave the associated recess. If an recess/holding-element combination only provides a device for preventing rotation, the fundamental problem of the bearing body lifting off from the holder in the axial direction can occur. This may be caused for example by mechanical vibrations or by the spherical bearing being in such a position that this happens while it is being transported. The mentioned way in which the holding element and the recess are made to match ensures that the bearing body cannot come out completely, i.e. cannot become completely detached from the holder. The position of the bearing body in which it is pressed onto the holder can then be regained at any time without the external intervention of an operator.

It is most particularly advantageous if the at least one recess is disposed in such a way that it can be made on the bearing body by machining operations with low angular velocity. In particular, the recess is disposed in such a way that it can be produced by grinding. In grinding, relatively large grinding wheels can be used, with which a high circumferential speed can be achieved for the machining with a relatively low angular velocity. This greatly simplifies the production of an recess in comparison with the production of a drilled hole.

In particular, the at least one recess is disposed and formed in such a way that it can be produced without drilling.

It may be provided that the bearing body has at least one holding element, which engages in an associated holding recess of the holder. Such a holding element can be produced for example by recesses being introduced on opposite sides of the bearing body and the holding element then resulting as a kind of central web. A means for preventing twisting is then provided by engagement in an recess of the holder. The recess on the holder may also be produced integrally with a bearing body positioned, for example, in an injection-molding process.

It may be provided that the at least one holding element is formed in such a way that an undercut is obtained when engagement in the associated holding recess occurs. As a result, particularly secure holding is made possible. In particular, the bearing body is prevented from lifting off from the holder, for example as result of mechanical vibrations.

In the case of a further embodiment, the bearing body has at least one oblique recess with respect to an axis of rotation. In this case, the recess preferably takes the form of a groove. This allows the bearing body to be held on the holder with a form fit in the manner of a screw thread, so that once again a means for preventing twisting is provided. Provided in particular in this case are a plurality of oblique recesses, which are spaced apart from one another to achieve fixing between the holder and the bearing body over a greater region.

The bearing body is advantageously fixed on the holder in a non-clamping manner, i.e. the holder does not exert any clamping force on the bearing body. Once again, "softer" plastics materials can be used for the holder.

In particular, the surface of the bearing body on which the bearing support can slide comprises at least one hemisphere. This allows a sliding surface to be provided at least as far as an equatorial plane.

It may be provided that a force acts on the bearing body in the direction of the holder. If such a force acts, the bearing body is pressed into the holder. If the frictional force between the bearing body and the holder is greater than that between the bearing shell and the bearing body, a device for preventing rotation is already provided. If this is not the case, a device for preventing rotation must be provided to ensure fixing. Such a device for preventing rotation can once again be achieved in a simple way, for example by means of one or more recesses and engaging holding elements, but clamping engagement of the holder on the bearing body is not necessary for this. It is also not necessary for a drilled hole to be provided in the bearing body. The force on the bearing body can be exerted via the bearing shell or via an additional component such as a plunger.

It is advantageous in this case if the force acts substantially coaxially in relation to an axis of rotation, so that no appreciable transverse forces are exerted.

With appropriate coupling between a rotor (which is connected to the bearing shell) and a stator, a corresponding force is exerted via the bearing shell. In the case of such a corresponding electric motor, it is always ensured that the rotor cannot lift off.

A plunger which acts on a surface region of the bearing body may also be provided. This plunger can be used to exert a (normal) force, to press the bearing body into a bearing bed on the holder. This increases the frictional force (as a product of the normal force and the coefficient of friction) between the bearing body and the holder. Fixing can be achieved as a result.

In particular, the plunger is aligned substantially coaxially in relation to an axis of rotation, so that there are no appreciable transverse forces.

It is most particularly advantageous if the plunger is fixed elastically with respect to a bearing housing in such a way that the distance between the plunger and the bearing housing is variable. In particular, the plunger is displaceable with respect to the bearing housing. As a result, allowance or compensation for thermal expansions can also be provided, so that, for example, when there is thermal expansion of the plunger, an increased force is not exerted on the holder for the bearing body.

It is advantageous in this case if the plunger is subjected to force in the direction of the bearing body and, for example, is subjected to force via a spring element. This is advantageous because it achieves the effect that the bearing body is pressed against the holder, but the force can be "dosed", so that for example increased force is not applied when there is thermal expansion.

It is advantageous if an elastic element which acts upon the plunger is disposed in a housing. A sliding bearing for the plunger can be formed by means of the housing.

In particular, the plunger is passed through a central region in the bearing shell that is free from material. The central region that is free from material serves in particular as a lubricating opening. Such a lubricating opening is described in DE 102 45 016 A1 or U.S. patent application Publication No. 2004/0000824 A1, to which reference is expressly made.

It may be provided that the bearing body is formed by means of a sphere or a ball. The sphere may be machined, with appropriate recesses being produced, in particular by grinding.

It is also possible in principle, however, for the bearing body to be formed by means of a segment of a sphere, which is at least a hemisphere.

The bearing according to embodiments of the invention can be advantageously used in an electric motor with a rotor and a stator. The bearing shell is in this case connected to the rotor.

In particular, the holder is integrally connected to a wall which delimits an air gap between the rotor and the stator.

It may be provided in this case that the electric motor is formed with respect to its magnetic arrangement in such a way that the bearing shell is pressed onto the bearing body in every operating and non-operating state. It is then only necessary to provide the bearing body with a device for preventing rotation. An appropriate bearing ball can then be fixed on the associated holder in a way which is technically simple in terms of production.

It is advantageous if the rotor is formed such that it generates a magnetic field and electronic commutation thereby takes place. The influence of the air gap on the properties of the electric motor is then reduced.

The spherical bearing according to embodiments of the invention or the electric motor according to embodiments of the invention can be used in an advantageous way in a circulation pump. The pumped liquid, and in particular water, can in this case also be used for lubricating the spherical bearing. By means of the air gap, the liquid is passed through an inner region between the bearing shell and the bearing body to provide the liquid lubrication.

BRIEF DESCRIPTION OF THE DRAWINGS

The following description of preferred embodiments serves for a more detailed explanation of embodiments of the invention in connection with the figures.

FIG. 2 shows a schematic representation of a first exemplary embodiment of a spherical bearing according to the invention;

FIG. 3 shows a schematic representation of a second exemplary embodiment of a spherical bearing according to the invention;

DETAILED DESCRIPTION OF THE PREFERRED EMBODIMENTS

Figure 1:
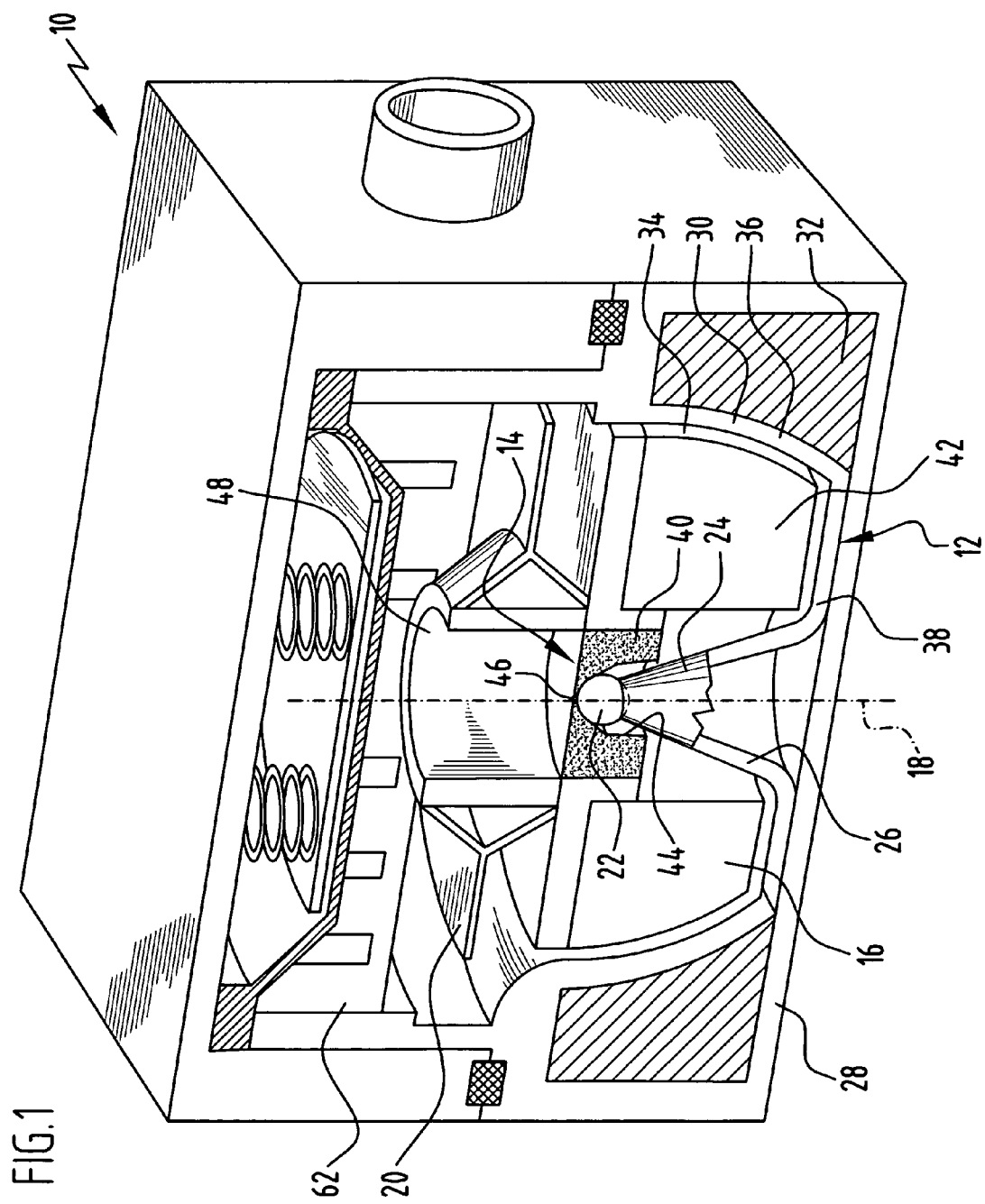
FIG. 1 shows a schematic partial representation of an exemplary embodiment of a circulation pump according to the invention.

Referring to FIG. 1, an exemplary embodiment of a circulation pump, which is designated in FIG. 1 as a whole by 10, includes an electric motor designated as a whole by 12. This electric motor 12 in turn includes a spherical bearing designated as a whole by 14, a rotor 16 of the electric motor 12 being mounted rotatably about an axis of rotation 18 by means of the spherical bearing 14. An impeller 20 of the circulation pump 10 is connected to the rotor 16 for rotation with the rotor.

The spherical bearing 14 comprises a bearing body 22 with a convex spherical surface. The bearing body 22 may be formed by means of a sphere or ball or a segment of a sphere, such as for example a hemisphere. The bearing body 22 is made of a hard material, and in a particular embodiment, a ceramic material.

The bearing body 22 is located on a holder 24 to be non-rotatable with respect to the holder. The holder 24 is formed in particular as part of a bearing support 26 or as the bearing support. The bearing support 26 is located to be non-rotatable with respect to a housing 28 of the circulation pump 10. The housing 28 may be a bearing housing for the spherical bearing 14.

The holder 24 is made of a plastics material, and in a particular embodiment, a thermoplastic material. PPS is an example of such a material. The bearing support 26 is connected to a wall 30, and, in a particular embodiment, is formed integrally with the wall 30, which delimits a stator 32 of the electric motor in relation to an air gap 34. The wall 30 also provides a liquid seal with respect to the stator 32.

The wall 30 has a region 36 in which the wall has, facing the rotor 16, a concave spherical surface. It may be provided that this region 36 is adjoined toward the bearing support 26 by a region 38 in which the wall 30 is formed in a substantially planar manner and a normal to the surface of wall region 38 is substantially parallel to the axis of rotation 18. The air gap 34 is spherically formed in the region 36 and has the form of a segment of a spherical shell.

Provided as the counterpart to the bearing body 22, which has a convex spherical surface, is a bearing shell 40, which has a concave spherical surface facing the bearing body 22. The bearing shell 40 is produced, for example, from carbon. It is mounted on the bearing body 22 and slides on it. The bearing shell 40 is connected to the rotor 16 to be non-rotatable with respect to the rotor.

In the case of the exemplary embodiment shown, the rotor 16 generates a magnetic field. For this purpose, it comprises a plurality of permanent magnets 42. Facing the spherical region 36 of the wall 30, the rotor 16 is likewise spherically formed, so that an air gap 34 in the form of a spherical shell is formed between the rotor 16 and the stator 32. The rotor 16 has a dividing wall, which provides a seal in relation to the air gap 34.

An inner region 44 of the bearing shell 40 in which the bearing body 22 lies is fluidically connected to the air gap 34. In this regard, at least part of the holder 24 may also lie in this inner region 44. As a result, liquid can flow via the air gap 34 into the inner region 44 and, as a result, provide bearing lubrication. Provided in the bearing shell 40 is a lubricating opening 46, via which the liquid can then be removed from the inner region 44.

The lubricating opening 46 is formed in a region of the bearing shell 40 that is central (in relation to the axis of rotation 18) and free from material. The central region that is free from material is in turn preferably formed in such a way that a force vector of the resulting overall force impinges on the region that is free from material if the rotor 16 is unsymmetrical with respect to the stator 32. Such an electric motor is described in DE 102 45 016 A1 or US 2004/0000824 A1, each of which is hereby incorporated by reference in its entirety.

The lubricating opening 46 is in connection with a suction side 48 of the circulation pump 10.

In accordance with embodiments of the invention, the bearing body 22 is held on the holder 24 to be non-rotatable with respect to the holder, a device for preventing rotation of the bearing body 22 itself being provided. The bearing body 22 is in this case held in a non-clamping manner; by contrast, for example, with a holder made of a metallic material, only limited clamping forces can be exerted because the holder 24 is formed by means of a plastics material.

In the case of a first exemplary embodiment of a spherical bearing according to the invention, which is shown in FIG. 2, a bearing ball 50 is located as a bearing body on a holder 52, which has an end face 54 in the form of a spherical shell. This end face 54 may be provided with a non-slip device, such as for example a non-slip coating. The non-slip feature may alternatively or additionally be formed by means of the bearing body 22. For example, its surface facing the end face 54 of the holder 52 is at least partly roughened. The non-slip coating may be formed for example by means of a rubber coating. The roughening may be produced for example by sandblasting the bearing body 22. The non-slip feature has the effect of increasing the coefficient of friction between the bearing ball 50 and the holder 52. The coefficient of friction is set such that the frictional force between the bearing body 22 and the holder 52 is greater than the frictional force between the bearing body 22 and the bearing shell 40.

A plunger 60, which lies substantially coaxially in relation to the axis of rotation 18 (the same reference numeral as in FIG. 1 is used for the axis of rotation) is passed through a lubricating opening 56 in a bearing shell 58. The plunger 60 is connected to the bearing housing 28. The plunger 60 is non-rotatable with respect to the bearing housing 28. For this purpose, it is for example connected to a housing wall such as the housing wall 62 (FIG. 1).

The plunger 60 acts on a surface region 64 of the bearing ball 50, this surface region 64 lying coaxially in relation to the axis of rotation 18. An extreme end 66 of the plunger 60 is adapted correspondingly to the spherical surface of the bearing ball 50. By means of the plunger 60, the bearing ball 50 is pressed into the end face 54 of the holder 52 as a bearing bed for the bearing ball 50, and consequently the normal force of the bearing ball 50 on the holder 52 is increased. This increases the frictional force between the bearing ball 50 and the holder 52. As a result, the bearing ball 50 is held on the holder 52 to be non-rotatable with respect to the holder. The holding of the bearing ball 50 on the holder 52 is in this case independent of the axial position of the bearing shell 40 (in relation to the axis of rotation 18), i.e. even if the rotor connected to the bearing shell 58 lifts off, the bearing ball 50 remains in its position on the holder 52, secured against rotation. Consequently, a device for preventing rotation is formed for the bearing ball 50 by means of the plunger 60; the bearing ball 50 is held on the holder 52 without the bearing ball itself having to be machined any further. In particular, a hole does not have to be drilled into the bearing ball 50. Drilling such a hole into a hard material, and in a particular embodiment, a ceramic material, requires relatively great effort and is therefore correspondingly cost-intensive. For example, a diamond drill has to be used to drill such a hole.

It may be provided that the plunger 60 is connected to the bearing housing 28 by means of an elastic element 68, and in a particular embodiment, a compression spring. The elastic element 68 is in this case disposed and formed, and in particular biased, in such a way that a force is exerted on the plunger 60 in the direction of the holder 52, in order in this way to press the bearing ball 50 into the bearing bed 54.

The elastic element 68 is disposed for example in a housing 70. The housing is in turn formed as a bearing 72, on which the plunger 60 is displaceably guided in the axial direction (coaxially in relation to the axis of rotation 18). As a result, the plunger 60 is not fixedly held on the bearing housing 28, but is indeed movably mounted. As a result, compensation for thermal expansion is made possible. If the plunger 60 is made of a metallic material, it has a greater thermal expansion than a ceramic bearing ball 50. In the case of a fixedly clamped plunger 60, this would mean that it exerts a greater force on the bearing ball 50, and consequently on the holder 52. Elastic suspension of the plunger 60 (by means of the elastic element 68) allows the plunger 60 to yield here, in that the elastic element 68 is compressed to some extent.

In the case of a similar exemplary embodiment, which is indicated in FIG. 3, a bearing body 74 is located on a holder 76 made of a plastics material. The bearing body 74 is formed by means of a hemisphere made of a ceramic material. A bearing bed 78 is formed on the holder 76. In this case a transverse mounting 80 is provided, for example in the form of a peripheral rim, preventing the bearing body 74 from slipping off the holder 76 to the side.

The plunger 60 is formed in principle in the same way as above and therefore the same reference numerals are also used.

In the case of the exemplary embodiment shown in FIG. 2, the bearing shell 58 reaches beyond an equatorial plane 82 of the bearing ball 50. In the case of the exemplary embodiment shown in FIG. 3, the corresponding bearing shell 84 reaches only as far as the equatorial plane.

As mentioned above, with the plunger provided in the way shown in FIGS. 2 and 3, the corresponding bearing body is held against rotation on the associated holder without a drilled hole having to be provided. This mounting is also achieved if the bearing shell itself does not press on the bearing body and thereby press the bearing body into its bearing bed on the holder. It is the plunger 60 that ensures that the corresponding bearing body 50 or 74 is pressed into its bearing bed and held there in a rotationally secure manner.

It is also possible in principle for the bearing ball 50 or the bearing body 74 to be injection-molded in its corresponding bearing bed in the holder 52 or 76, respectively.

Figure 4:
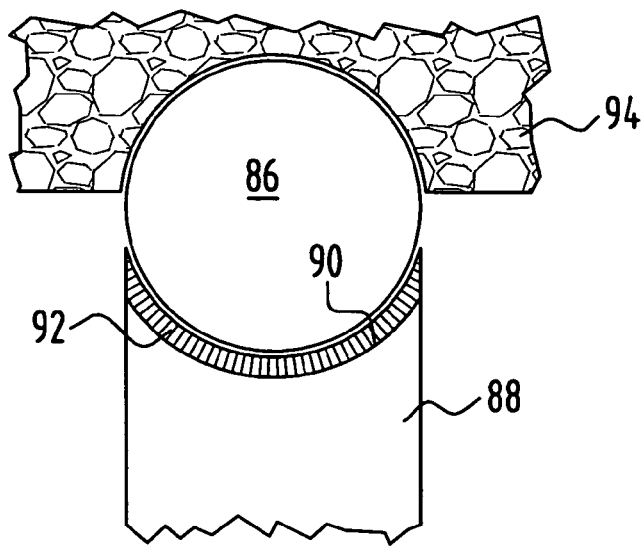
FIG. 4 shows a schematic representation of a third exemplary embodiment of a spherical bearing according to the invention.

In the case of a third exemplary embodiment, which is shown in FIG. 4, a bearing ball 86 is located as a bearing body on a holder 88 with a spherical bearing bed 90. The bearing bed 90 is provided with a non-slip coating 92, such as for example a rubber coating. This non-slip coating serves as a non-slip feature for the purpose of holding the bearing ball 86 on the holder 88 to be non-rotatable with respect to the holder. The non-slip coating 92 consequently forms a device for preventing the bearing ball 86 from rotating.

In the case of this exemplary embodiment, a plunger is not provided for pressing the bearing ball 86 into the bearing bed 90. Rather, the electric motor is formed here in such a way that a rotor connected to a bearing shell 94 cannot lift off. In particular, such a magnetic force that the corresponding rotor presses the bearing shell 94 onto the bearing ball 86 is constantly acting.

The bearing ball 86 is held on the holder 88 in a non-rotatable manner without a drilled hole having to be provided in the bearing ball 86.

Figure 5:
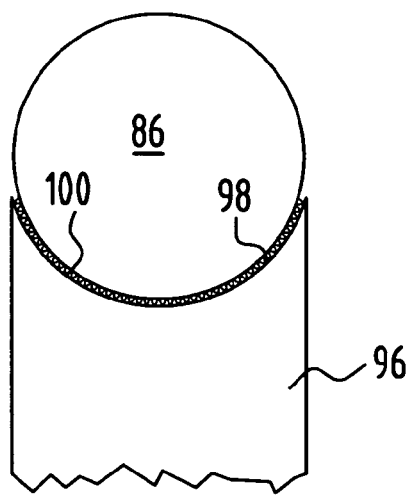
FIG. 5 shows a schematic representation of a fourth exemplary embodiment of a spherical bearing according to the invention.

In the case of an alternative embodiment, which is schematically shown in FIG. 5, the bearing ball is roughened on a surface which is facing an end face 98 of the holder 96, for example by sandblasting. This has the effect of increasing the coefficient of friction for the sliding in the bearing bed 100, whereby in turn a non-slip feature is formed for the bearing ball 86. Otherwise, this fourth exemplary embodiment according to FIG. 5 operates in the same way as the exemplary embodiment described in connection with FIG. 4.

Figure 6:
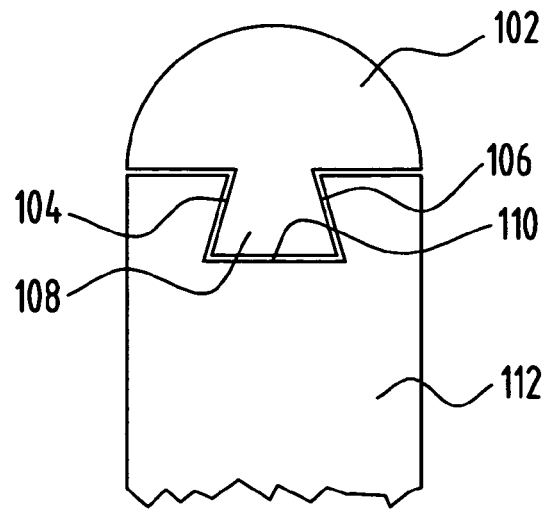
FIG. 6 shows a schematic representation of a fifth exemplary embodiment of a spherical bearing according to the invention.

In the case of a fifth exemplary embodiment, which is schematically shown in FIG. 6 (without the bearing shell), a bearing body 102 is formed by means of a ball which has opposing recesses 104, 106. The recesses may be disposed parallel to one another (not shown in FIG. 6) or be disposed in such a way that the bearing body 102 has a trapezoidal holding element 108. When the holding element 108 has engaged in an associated holding recess 110 of a holder 112, this trapezoidal shaping can achieve an undercut by means of which secure holding (against rotation) of the bearing body 102 on the holder 112 is once again achieved. In a particular embodiment, the bearing body 102 is injection-molded in the holder 112 by means of a holding element, so that the holding recess 110 is created during the production process of the holder 112 with the inserted bearing body 102.

The recesses 104, 106 are disposed in such a way that they can be produced by a machining operation with a small angular velocity, and in a particular embodiment, by grinding. To produce a drilled hole in a bearing body 102 made from a hard material, a drilling tool with a correspondingly small circumference is necessary. For example, spherical bearings exist with bearing bodies which have a diameter of 6 mm. The diameter of a corresponding drilled hole must then be of the order of magnitude of 1 mm. In order for the drill to have an adequate circumferential speed during the drilling, it must be driven at a very high rotational speed (angular velocity).

The recesses 104, 106 can be produced by grinding. Correspondingly large grinding wheels may be used here, to achieve the required circumferential speed with a small angular velocity. The expense involved in producing the recesses 104, 106 is considerably less than that for producing drilled holes through the bearing body 102.

Figure 7A:
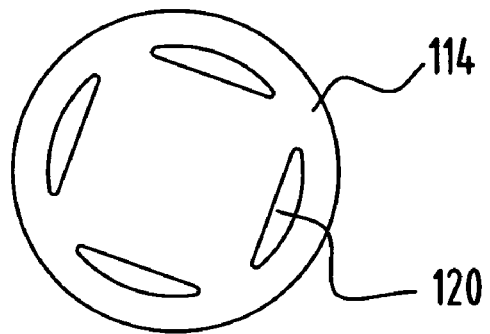
FIG. 7(a) shows a view of a separate bearing body for the spherical bearing shown in FIG. 7(b)
Figure 7B:
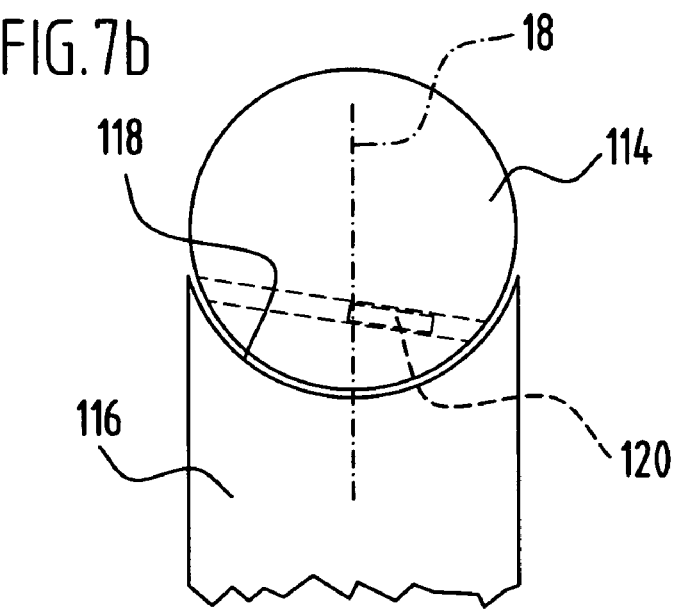
FIG. 7(b) shows a schematic representation of a sixth exemplary embodiment of a spherical bearing according to the invention.

In the case of a sixth exemplary embodiment, which is shown in FIGS. 7(a) and 7(b), a ball 114 is located as a bearing body on a holder 116 with a bearing bed 118. The ball 114 has a plurality of recesses 120, which are formed as grooves and are correspondingly produced. The recesses 120 once again lie obliquely in relation to the axis of rotation 18. The recesses 120 (an exemplary embodiment with four recesses 120 is shown in FIG. 7(a)) are distributed about a spherical axis of the ball 114. The recesses 120 allow the ball 114 to be placed on the holder 116 or held in it in the manner of a screw thread. A good form fit is achieved as a result, to provide a device for preventing rotation.

In particular, the ball 114 with its recesses 120 may be injection-molded in the holder 112.

Figure 8:
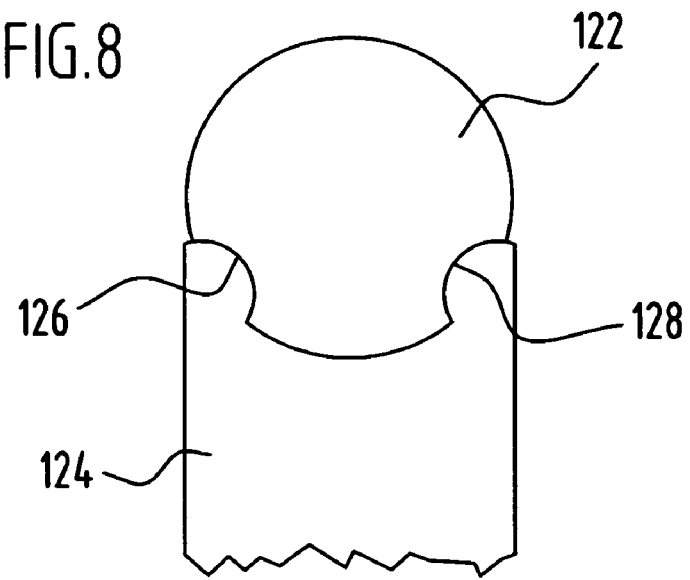
FIG. 8 shows a schematic representation of a seventh exemplary embodiment of a spherical bearing according to the invention.

In the case of a seventh exemplary embodiment, which is shown in FIG. 8, a bearing body 122 is located on a holder 124. Formed in the bearing body 122, which is spherical, from the surface are opposed channel-shaped recesses 126, 128, in which material of the holder 124 engages. In a particular embodiment, the bearing body 122 is injection-molded in the holder 124 and in this way is located on the holder 124 in a rotationally secure manner.

In the case of the exemplary embodiments according to FIGS. 6 to 8, fixing of the corresponding bearing bodies on the associated holder in a manner which is secured against rotation has been achieved independently of the position of the rotor. These embodiments are therefore suitable for all kinds of electric motors, i.e. also for those in the case of which the rotor with the corresponding bearing shells can lift off.

Figure 9:
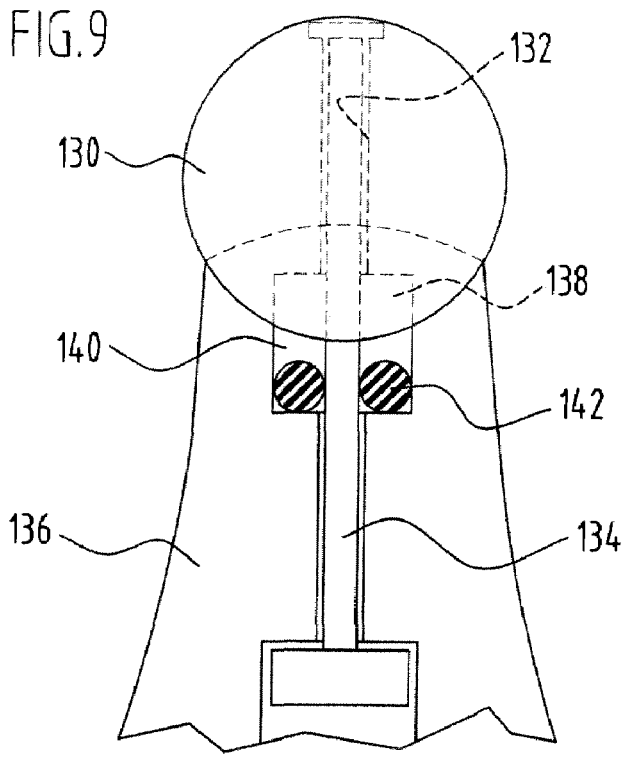
FIG. 9 shows a schematic representation of an eighth exemplary embodiment of a spherical bearing according to the invention.

It is also possible in principle, as shown in FIG. 9 on the basis of an eighth exemplary embodiment, for a bearing body 130 to have a drilled hole 132 and for the bearing body to be connected to a bearing support 136 as a holder by means of a fixing element such as a screw 134, in order in this way to fix the bearing body 130 to the bearing support 136.

In addition, the bearing body 130 can have one or more recesses 138, in which material of the bearing support 136 is located. The bearing body 130 is, for example, injection-molded in the bearing support 136. It may alternatively be provided on the bearing support 136 by turning on a lathe.

Formed in the bearing support 136, facing the bearing body 130, is an recess 140, through which the screw 134 is passed. Located in the recess 140 around the screw 134 is a seal 142, for example in the form of an O-ring. The seal 142 prevents liquid from being able to flow via the drilled hole 132 through the recess for the screw 134 through the bearing support 136.

Figure 10A:
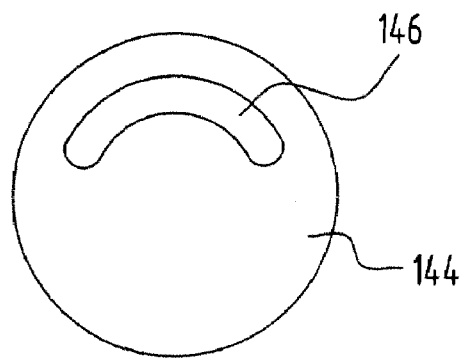
FIG. 10(a) shows a view of a separate bearing body for the spherical bearing shown in FIG. 10(b)
Figure 10B:
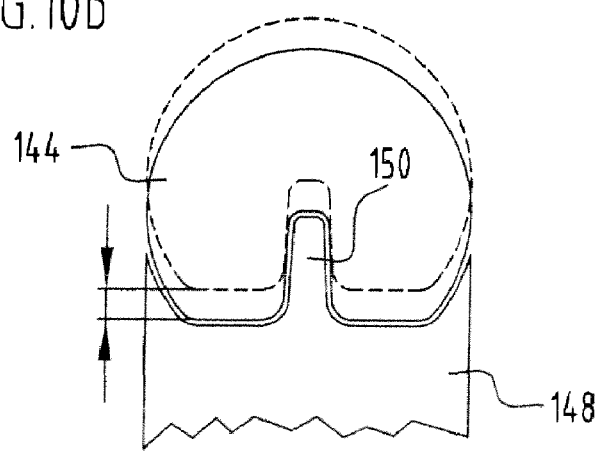
FIG. 10(b) shows a schematic representation of a ninth exemplary embodiment of a spherical bearing according to the invention.

In the case of a ninth exemplary embodiment, which is shown in FIGS. 10(a) and 10(b), a spherical bearing body 144 has an recess 146. This recess 146 has been made for example by means of a grinding wheel.

The bearing body 144 is located on a holder 148 to be non-rotatable with respect to the holder. This holder comprises a holding element 150, which rises up in the axial direction (parallel to the axis of rotation 18), engages in the recess 146 and, as a result, holds the bearing body 144 on the holder 148 in a non-rotatable manner. The combination between the recess 146 and the matched holding element 150 consequently forms a device for locking rotation.

The recess 146 is of such a depth in the axial direction (parallel to the axis of rotation 18) and the holding element 150 is of such a height in this direction, that, when the bearing body 144 and the holder 148 are at their greatest distance apart, the holding element 150 cannot completely leave the recess 146, i.e. at least part of the holding element 150 is always engaged in the recess 146. This means once again that the bearing body 144 cannot become completely detached from the holder 148, and is consequently held "captively" on the holder 148.

The bearing body 144 can be held "loosely" on the holder 148, i.e. "only" a device for preventing rotation is provided. If the bearing body 144 lifts off from the holder 148 while the corresponding bearing is being transported, or on account of mechanical vibrations, it is nevertheless ensured that it cannot lift off completely and become detached.

The solution according to embodiments of the invention, in which the bearing body 22 is located on a holder 24 made of a plastics material, allows the effect to be achieved that the fixing of the bearing body 22 on its holder 24 can be carried out in a simple and low-cost way. In particular, drilling through the bearing body made of a hard material can be avoided. Bearing bodies made of particularly hard materials, such as silicon-carbide ceramics, can then also be used.

Therefore, expensive processing can be avoided, it being possible to provide that the bearing body is held on the associated holder by means of recesses (cf. FIGS. 6 to 10). Such recesses can, however, be produced at lower angular velocities in comparison with drilled holes.

It is then no longer necessary to clamp the bearing body, so that a metallic holder is also no longer necessary.

Mounting of a bearing body in a manner which is secured against rotation can be achieved in accordance with embodiments of the invention, it being possible for the bearing body to be used at least as far as the equator.

The solution according to embodiments of the invention can be advantageously used when a rotor with a connected bearing shell generates a magnetic field, i.e. is coupled to a stator in a permanently magnetic manner. In the case of the stator, electronic commutation is provided. The air gap 34 then has a relatively small influence, so that once again metallic dividing walls are no longer necessary for the air gap 34.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. An electric motor, comprising:
   a rotor;
   a stator;
   a wall which delimits an air gap between the rotor and the stator; and
   a spherical bearing, said spherical bearing comprising:
      a holder integrally connected to the wall;
      a bearing body with a substantially convex spherical surface disposed on the holder, the holder and the wall being formed of a plastics material, the holder and the bearing body being held non-rotatably with respect to each other; and
      a bearing shell with a concave spherical surface, the bearing shell being rotatably mounted on the bearing body.

2. The electric motor as claimed in claim 1, wherein the holder is made of a thermoplastic material.

3. The electric motor as claimed in claim 1, wherein the holder is connected to a bearing housing of the bearing.

4. The electric motor as claimed in claim 1, wherein the bearing shell is connected to a rotor.

5. The electric motor as claimed in claim 4, wherein the holder is integrally connected to a wall which is facing the rotor.

6. The electric motor as claimed in claim 1, wherein the bearing body is made of a hard material.

7. The electric motor as claimed in claim 6, wherein the hard material is a ceramic material.

8. The electric motor as claimed in claim 1, wherein the holder is adapted in its shaping to the shaping of the bearing body.

9. The electric motor as claimed in claim 1, wherein the spherical bearing further comprises:
   a device for preventing rotation, the device being adapted to hold the bearing body on the holder to be non-rotatable with respect to the holder.

10. The electric motor as claimed in claim 9, wherein the device for preventing rotation includes a non-slip device.

11. The electric motor as claimed in claim 10, wherein a non-slip coating is arranged on the holder.

12. The electric motor as claimed in claim 10, wherein a surface of the bearing body that faces the holder is roughened to form the non-slip device.

13. The electric motor as claimed in claim 1, wherein the bearing body is injection-molded in the holder.

14. The electric motor as claimed in claim 1, wherein the bearing body has one or more recesses, in which holding elements engage.

15. The electric motor as claimed in claim 14, wherein the at least one recess is adapted to retain at least a portion of a holding element therein when the bearing body and the holder are at their greatest distance apart.

16. The electric motor as claimed in claim 14, wherein the at least one recess is produced on the bearing body by machining operations with low angular velocity.

17. The electric motor as claimed in claim 16, wherein the at least one recess is produced by grinding.

18. The electric motor as claimed in claim 14, wherein the at least one recess is formed without drilling.

19. The electric motor as claimed in claim 1, wherein the bearing body has at least one holding element engaging an associated holding recess of the holder.

20. The electric motor as claimed in claim 19, wherein the at least one holding element forms an undercut when engaged to a holding recess.

21. The electric motor as claimed in claim 1, wherein the bearing body has at least one oblique recess with respect to an axis of rotation.

22. The electric motor as claimed in claim 21, wherein the bearing body has a plurality of oblique recesses, which are spaced apart from one another.

23. The electric motor as claimed in claim 1, wherein the bearing body is fixed on the holder in a non-clamping manner.

24. The electric motor as claimed in claim 1, wherein the surface of the bearing body on which the bearing shell can slide comprises at least one hemisphere.

25. The electric motor as claimed in claim 1, wherein a force acts on the bearing body in the direction of the holder.

26. The electric motor as claimed in claim 25, wherein the force acts substantially coaxially in relation to an axis of rotation.

27. The electric motor as claimed in claim 25, wherein the force is exerted via the bearing shell.

28. The electric motor as claimed in claim 25, further comprising a plunger acting upon a surface region of the bearing body.

29. The electric motor as claimed in claim 28, wherein the plunger is aligned substantially coaxially in relation to an axis of rotation.

30. The electric motor as claimed in claim 28, wherein the plunger is fixed elastically with respect to a bearing housing in such a way that the distance between the plunger and the bearing housing is variable.

31. The electric motor as claimed in claim 30, wherein the plunger is subjected to force in the direction of the bearing body.

32. The electric motor as claimed in claim 30, wherein an elastic element which acts upon the plunger is disposed in a housing.

33. The electric motor as claimed in claim 28, wherein the plunger is passed through a central region in the bearing shell that is free from material.

34. The electric motor as claimed in claim 33, wherein the plunger is passed through a lubricating opening in the bearing shell.

35. The electric motor as claimed in claim 1, wherein the bearing body is formed by a sphere.

36. The electric motor as claimed in claim 1, wherein the bearing body is formed by a segment of a sphere which is at least a hemisphere.

37. The electric motor as claimed in claim 1, wherein the bearing shell is pressed onto the bearing body in every operating and non-operating state.

38. The electric motor as claimed in claim 1, wherein the rotor is formed such that it generates a magnetic field.

39. A circulation pump which is provided with an electrical motor, said electric motor comprising:
- a rotor;
- a stator;
- a wall which delimits an air gap between the rotor and the stator; and
- a spherical bearing, said spherical bearing comprising:
  - a holder integrally connected to the wall;
  - a bearing body with a substantially convex spherical surface disposed on the holder, the holder and the wall being formed of a plastics material, the holder and the bearing body being held non-rotatably with respect to each other; and
  - a bearing shell with a substantially concave spherical surface, the bearing shell being rotatably mounted on the bearing body.

* * * * *

UNITED STATES PATENT AND TRADEMARK OFFICE
CERTIFICATE OF CORRECTION

PATENT NO. : 7,382,070 B2  Page 1 of 1
APPLICATION NO. : 11/055140
DATED : June 3, 2008
INVENTOR(S) : Karsten Laing and Janos Ternak It is certified that error appears in the above-identified patent and that said Letters Patent is hereby corrected as shown below:

On the title page item [30] should read:
-- (30)  Foreign Application Priority Data
  Feb. 12, 2004          (DE) ………………….10 2004 008 158.1 --.

Signed and Sealed this

Twenty-third Day of September, 2008

JON W. DUDAS
*Director of the United States Patent and Trademark Office*